May 11, 1926.
A. REIN ET AL
1,584,193
METHOD OF MOLDING OR PRESSING AND ARTICLE
Filed Feb. 18, 1925
2 Sheets-Sheet 1
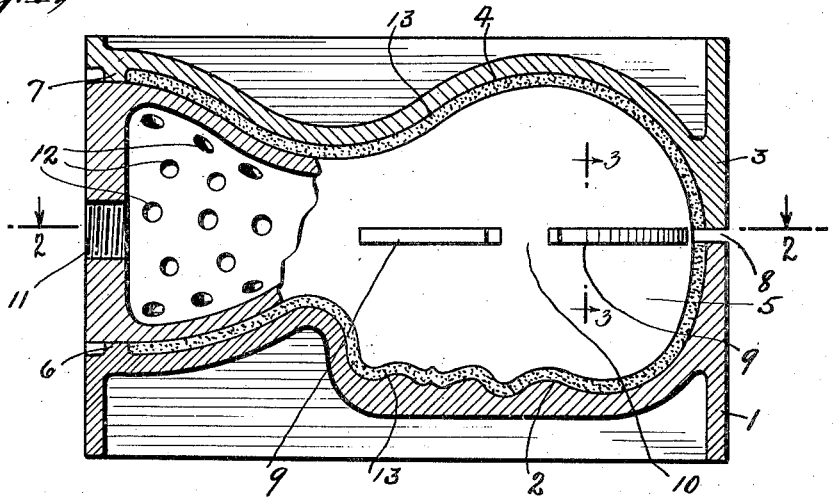
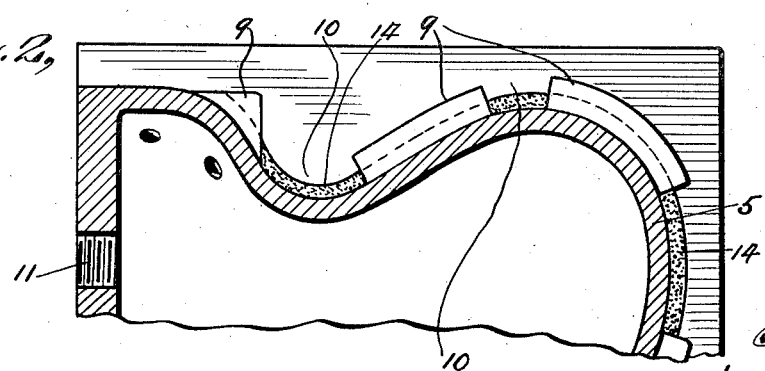
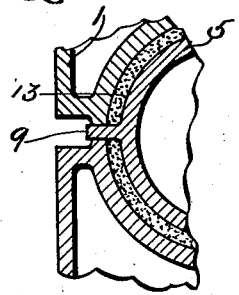
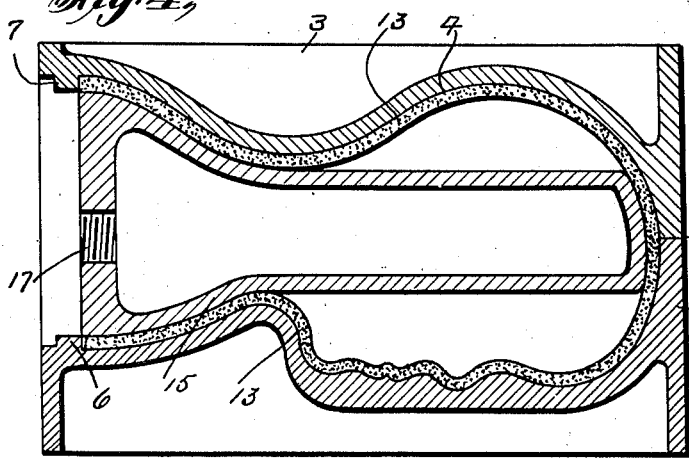
INVENTORS
Alexander Rein
Rudolf Liefke
BY
Riddle and Margesson
ATTORNEYS May 11, 1926.
A. REIN ET AL
1,584,193
METHOD OF MOLDING OR PRESSING AND ARTICLE
Filed Feb. 18, 1925 2 Sheets-Sheet 2
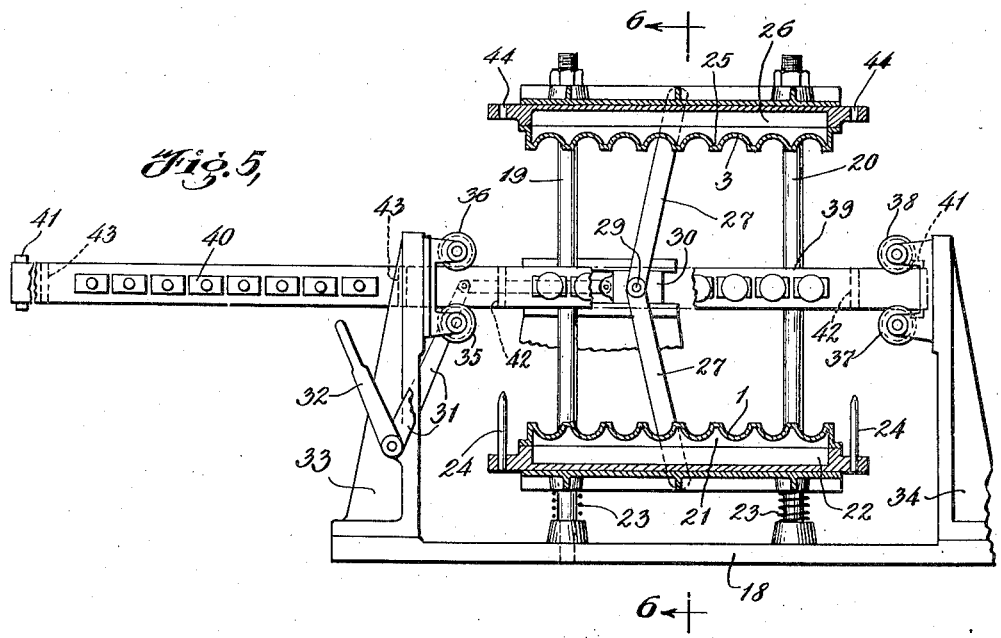
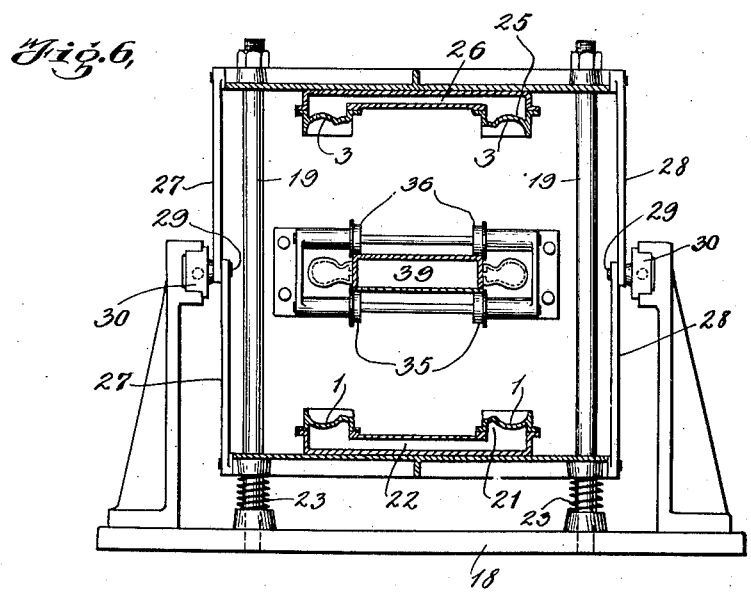

Patented May 11, 1926.

1,584,193

UNITED STATES PATENT OFFICE.

ALEXANDER REIN AND RUDOLF LIEFKE, OF NEW YORK, N. Y., ASSIGNORS TO RUDOLF LIEFKE, ROBERT ADELMANN, AND ROBERT E. LEYENDECKER, COPARTNERS DOING BUSINESS AS R. LIEFKE & COMPANY, OF NEW YORK, N. Y.

METHOD OF MOLDING OR PRESSING AND ARTICLE.

Application filed February 18, 1925. Serial No. 9,917.

Our invention relates to an improved method of casting, and while our method is adapted for casting materials of various kinds, yet the invention is particularly directed to an improved method of casting dolls' heads.

In the method employed for casting such articles at the present time the head of the doll is cast in two pieces, which must afterwards be glued or otherwise attached to each other. This, of course, adds to the expense of manufacture and has not proven entirely satisfactory on the whole, for the reason that if the head is dropped, it is likely to fall apart or divide at the glued joint.

According to the present invention, we take the material which is to be cast, and when dolls' heads are being made the material is, for example, wood, flour, resin and glue, and after this material has been thoroughly mixed and while it is in a soft or semi-soft, semi-plastic condition it is applied to the face of several mold sections, preferably two. Pressure is then applied to the material in the mold sections to conform the material to the outlines of the mold and to at the same time cause some of the material to be extruded at predetermined points about the periphery of the mold sections. This extruded material provides a number of offsets attached to the main body of the material. To obtain the pressure necessary to conform the material to the mold sections and to cause an extrusion of some of the material we employ a core, upon which the mold sections are superimposed. The core is of such a thickness as to prevent meeting of the edges of the mold sections and is provided with an annular flange, which lies when the mold sections are in place between the adjacent edges of the mold. This prevents the mold sections from meeting each other, and the flange is provided at intervals with cut-out portion or voids, into which the extruded material is forced by the pressure of the mold sections on the core. The core is heated, preferably, and the parts are left in superimposed position until the material being cast is slightly hardened, but before this material has taken a permanent set the core is removed. The mold sections are then again placed in superimposed relation and at this stage of the process the mold sections are allowed to come together so as to bring the offsets provided by the extrusion of the material during the first step of the process into contact with each other. In fact, the offsets are now forced into each other, and as they are still in a semi-plastic condition, they will unite to provide a single member or offset. With the parts in this position the heat is again applied and this time the material is heated until it has hardened. This method provides a doll's head, for example, which may be said to be in one piece instead of in two pieces, as provided by the methods now in commercial use, and we have found that such a head may be dropped without splitting, the several original sections of the casting being joined and held united by the offsets provided by the extrusion of the material as above described.

We have described our invention in connection with the casting of doll's heads, but it is to be understood that castings of other articles may be made by our improved method.

In the casting of dolls' heads it is desirable also at the same time to cast the neck and shoulder portions of the doll, and it will be understood, and will be pointed out in detail hereinafter, that the core which is first applied to the molds not only is shaped to cast the head but the neck and shoulders as well. We might here mention also that in the second step of the method, that is to say, after the original core has been removed, a second core is employed, which, however, is not like the first core in that the head portion, that is to say, the portion which conforms the material to the inside of the molds, is omitted, the shoulder and neck portions, however, being retained. This enables the interior of the mold to be heated thoroughly in the last step of hardening the material being cast.

We have shown in the accompanying drawings a doll's head in the various stages of manufacture and we have also illustrated a machine which may be employed in our improved method. This improved machine is so constructed as to enable a plurality of heads to be cast simultaneously, and, as will be pointed out in detail hereinafter, comprises a bed on which is mounted any desired number of mold sections, which, for example, may be the sections to form the face of the doll. We then provide a series or a plurality of cores, the first cores to be used so arranged that they may be placed in the mold sections carried by the bed of the machine simultaneously, that is to say, in the one operation. We then provide another set of mold sections, which, for example, may comprise the back of the head of the doll, and these sections are so arranged that they can be moved down upon the cores after the cores have been placed in the other sections of the mold. By simple operation these mold sections may then be raised, the cores removed simultaneously, and the second cores moved into place, whereupon the mold sections will then be superimposed on this core. While this machine is simple in its construction and operation, we appreciate that changes may be made therein without departing from the spirit and scope of our invention and hence we desire not to be limited to the exact details of this machine.

In the accompanying drawings we have illustrated the head of a doll in its various stages of manufacture as well as a machine for the practice of our invention, and in these drawings—

Fig. 1 is a sectional elevational view of our improved mold showing the first step of our improved method;

Fig. 2 is a section on the line 2—2 of Fig. 1 looking in the direction of the arrows, this view showing the material which is extruded from the molds in the voids between the flanges or fins on the mold core;

Fig. 3 is a section on Fig. 1 taken on the line 3—3 in the direction of the arrows thereon;

Fig. 4 is a sectional elevational view similar to Fig. 1 showing the second core in place and the doll's head in the last stages of its manufacture;

Fig. 5 is a part sectional elevational view of a machine which is adapted for use in the practice of our invention; and Fig. 6 is a section on the line 6—6 of Fig. 5.

Referring to the drawings in detail, and first of all to Figs. 1 to 4, inclusive, 1 designates one section of a mold adapted for use in the practice of our invention, the mold section of this figure being adapted for use in the casting of a doll's head. This mold section is concave, as indicated, the concave face thereof, designated 2, being shaped to form the face as well as the neck and shoulder portion of a doll. 3 designates another mold section, also concave, to provide a concave face 4 adapted to provide the back of the head, neck and shoulders of a doll. 5 designates a core upon which the mold sections 1 and 3 are adapted to be superimposed, the core 5, as shown in Fig. 2, being provided with faces to correspond to the conformation of the concave faces of the mold sections 1 and 3. The mold sections 1 and 3 are provided with offsets 6 and 7, adapted to engage the base of the core 5, the core being of such a thickness that when the same is interposed between the mold sections 1 and 3 the mold sections are maintained spaced from each other, as we have indicated at 8. The core 5 is provided with laterally extending fins 9, these fins when the mold sections are in superimposed position filling the space between the mold sections, except at the voids 10, these voids being cut-out portions of the flanges 9, the purpose of which will be pointed out hereinafter. The core 5 is provided with an opening 11 for the attachment of a gas tube or other heating device, whereby the core may be heated during the casting operation, the air necessary for supporting combustion within the core being admitted through air inlet openings 12. It is to be understood, of course, that while we have illustrated a core which may be heated by gas or similar means, it is within the scope of our invention to heat the core in any other way desired, as, for example, electrically.

In the casting of a doll's head, for instance, in the mold above described the material which is to be cast, designated 13, and which may be, for example, a mixture of wood, flour, resin and glue, is applied to the concave faces of the mold sections 1 and 3 and pressed into the mold sections to take the shape thereof. The initial application of the material being cast may be performed by hand, for instance. The mold sections are then superimposed upon the core 5 and the weight of the mold sections upon this core will cause the material 13 to be pressed into intimate contact with the entire face of the mold sections and will also cause some of the material to be extruded into the voids 10 between the flanges 9 on the core, as indicated at 14. This extruded material provides offsets or projections on the material of the casting. Heat is then applied to the core 5 to slightly harden the material 13, but not to the degree necessary for the finished casting. The core 5 is then removd by lifting off either one or both of the mold sections 1 and 3 and a core designated 15 substituted. This core is hollow, the same as the core 5, but is of a different shape, as will be apparent from an inspection of Fig. 4, the neck and shoulder portions of the doll only to be retained, the portion employed with the core 5 for conforming the material to the back of the head and face of the doll being straight, for example, in this core, as is also apparent from Fig. 4. This core is of such a thickness as to permit the mold sections 1 and 3 when superimposed thereon to meet at their edges, as we have indicated at 16. This core may be heated by applying a gas pipe to the orifice 17 therein or may be heated in any other suitable manner. The mold sections 1 and 3 containing the partially finished casting are superimposed upon the core 15, and inasmuch as the mold sections may now move toward each other until they touch, as above indicated, the offsets 14 will now move or be moved into engagement with each other and pressed into each other, so to speak, to form a union between the offsets. Heat is then applied to the interior of the core 15 and maintained until the material 13 has hardened to the degree desired, after which the mold sections are removed and the core 15 pulled out of the casting, leaving a one-piece casting, the two original sections being united by the off-sets 14. The offsets, as we have termed them, may be of any length desired, that is to say, the flanges 9 on the core 5 may be shortened or lengthened as may be found expedient, and as a matter of fact, may be shortened so that the joint between the two sections of the casting is almost continuous throughout the line of division provided originally between the two casting sections.

We have found that the method and apparatus above described provide a very much improved way of manufacturing doll's heads, although, if desired, the same method may be employed for casting other articles, heads made by our improved method being practically in one piece, the two sections of the castings being so firmly united by the off-sets 14 that the doll's head may be handled carelessly without danger of breaking the same. This is a marked improvement over the method now employed in the manufacture of similar articles where the castings are made in two sections which are afterwards glued together. We find also that the manufacture of dolls' heads, particularly, is very much expedited by our improved method, inasmuch as it takes far less time to make a head by our method than by the methods now employed, with a far better result.

We have described the manufacture of a head employing two mold sections only, but it is to be understood that two sections have been illustrated and described merely by way of illustration, it being obvious that more sections may be employed if it should be found desirable. In such an event, of course, the core 5 would be provided with fins or offsets or flanges 9 to correspond to the increased number of mold sections employed.

Referring to the machine of Figs. 5 and 6 in detail: We might say that this machine is designed for the casting of a plurality of articles simultaneously, thereby reducing the cost of manufacture very considerably. This machine comprises a bed or base plate 18 carrying two sets of posts or verticals 19 and 20. Mounted adjacent the lower end of these posts and movable vertically of the same is a mold section designated 21 and carrying a plurality of mold sections 1 referred to in our description of Fig. 1. A gas chamber 22 is provided in this section for heating the mold. The mold 21 is resiliently supported when the same is not in use upon springs 23.

At each end of the mold 21 we provide positioning pins 24, four of these pins being employed in the machine as illustrated.

At the upper end of the posts 19 and 20 we provide a mold section 25 carrying a plurality of mold sections 3, already referred to in our description of Fig. 1. This mold section is likewise provided with a gas chamber 26, by which the molds 3 may be conveniently heated. Operatively connected to the mold sections 21 and 25 are two pairs of links designated 27 and 28, the links constituting each pair being pivoted to each other by pins 29. The links are attached at their pivot to a slide 30, a slide being provided for each pair of links, as illustrated in Fig. 6. Operatively connected to the links 27 and 28 is one arm 31 of a bell crank lever, the other arm 32 of this lever being manually operated, or it may be operated by power, if desired, to break the toggles provided by the two pairs of links 27 and 28. In other words, if the handle or lever 32 be depressed from the position shown on Fig. 5, the toggles uniting the mold sections 21 and 25 will be broken to cause these two mold sections to approach each other, the section 21 moving upwardly while the section 25 moves downwardly.

The bed or base plate 18 heretofore referred to carries supporting frames 33 and 34, the frame 33 at its upper end being provided with a pair of spaced rollers 35 and 36, while the frame or support 34 carries at its upper end spaced rollers 37 and 38. Supported in these rollers is a relatively long flat member constituting the first and second cores employed in the practice of our improved method, one set of cores, that is to say, the first set, being designated 39, while the other set, that is, the second cores, are designated 40. The cores, or the plate constituting the two sets of cores 39 and 40, is provided at each end with a stop 41, the stop at the left-hand end, as viewed in Fig. 5, limiting the movement of the cores to the right, while the stop at the other end limits the movement of the cores to the left. The stop at the right-hand end is in operative position with the parts as shown in Fig. 5. The core-carrying member is provided with orifices 42 adapted to receive the pins 24 when the mold sections 21 and 25 are actuated. The core-carrying member is provided also with orifices 43 adapted to receive the pins 24 when the core-carrying members move to right-hand position.

The operation of the machine above described is as follows: The material to be cast is placed in the mold sections 21 and 25, these mold sections, as above pointed out, corresponding to the sections 1 and 3 of Fig. 1, it being understood, of course, that the material at that time is in a plastic condition. With the first set of cores 39 in the position of Fig. 5 the handle 32 is depressed to break the toggles constituted by the links 27 and 28, drawing the mold sections 21 and 25 toward each other in superimposed position relatively to the cores of the core section 39, the pins 24 passing through the orifices 42 and into the orifices 44 provided for that purpose in the mold section 25. When the lever 32 is fully depressed the molds will be in the same position as shown in Fig. 1, relatively to the cores, causing some of the material in the molds to be extruded into the voids provided between the fins 9 on the cores. The parts are left in this position long enough for the material to take a slight set but not sufficiently long to enable the material to harden, it being understood that heat is being supplied to the molds by means of the gas chambers 22 and 26, for example. The lever 32 is then raised again to carry the members 21 and 25 out of engagement with the core section 39 and then the core-carrying member is moved to the right to bring the cores 40 into position between sections 21 and 25. The lever or handle 32 is then again depressed to close the molds upon the cores 40, as illustrated in Fig. 4, and this time the parts are left in this position until the material being cast has hardened to the degree desired.

It will be understood, of course, that changes may be made in the details of our improved machine without departing from the spirit and scope of our invention.

What we claim is:

1. The method of forming an article, which method consists in applying the material to be formed to the face of a plurality of mold sections, applying pressure to the material to conform it to the mold sections and to extrude some of the material to provide offsets or projections thereon, thereafter so disposing the mold sections and their contained material relative to each other that the said offsets are brought into contact under pressure and then hardening to thereby bind the material carried by one mold section to the material carried by the adjacent mold section.

2. The method of forming an article, which method consists in applying the material to be formed while in a plastic condition to the face of a plurality of mold sections, conforming the material to the mold sections and by the application of pressure thereto providing offsets on the several sections of the material, thereafter so disposing the mold sections each with its contained material relatively as to bring the said offset portions into engagement with each other under pressure, and while the mold sections and their contained material are so disposed applying heat to the material to harden the same and to bind the several sections to each other by said offsets.

3. The method of forming an article which method consists in applying the material to be formed while in a soft or semi-soft condition to the interior of a plurality of mold sections, superimposing these mold sections and the contained material upon a core to conform the material to the mold and to extrude some of the material to provide offsets or projections on the several sections of the material, separating the mold sections and their contained material, then removing the core and with the mold sections and contained material so disposed as to bring the offsets on material in contact with each other hardening the material to bind the several sections thereof to each other by said offsets.

4. The method of forming a hollow article which method consists in applying the material to be formed to the face of a plurality of mold sections, superimposing these mold sections and their contained material upon a core to conform the material to the mold sections and to cause an extrusion of some of the material in the form of offsets integral with the material carried by the mold sections, removing the core by separating the mold sections containing the material being formed and thereafter moving the mold sections into closer relation to bring the said offsets into contact and finally hardening the material to bind the several sections of the material to each other.

5. The method of forming an article which method consists in applying the material to be formed to the face of a plurality of mold sections, superimposing these mold sections upon a core of such a thickness as to prevnt contact of the mold sections with each other, the pressure of the sections of the mold causing some of the material to be extruded, removing the core by separating the mold sections and their contained material and thereafter placing the mold sections in superimposed relation and sufficiently close to each other to cause the extruded material from one mold section to unite with the extruded material of the adjacent section and hardening while in such position to thereby bind the materials carried by the several mold sections into a unitary structure.

6. The method of forming an article which method consists in applying the material to be formed while in a plastic semi-soft condition to the face of each of a plurality of mold sections, superimposing these mold sections upon a core to conform the material to the mold sections and to extrude some of the material at predetermined points about the periphery of each mold section, heating the core to partially harden the material being formed, separating the mold sections and their contained material so as to remove the core, and thereafter positioning the mold sections with the material carried thereby in superimposed relation with the material extruded from one mold section in register with the material extruded from the adjacent mold section, applying pressure to the material to unite the material extruded from one mold section with the material extruded from the adjacent mold section, and finally heating to harden the material to provide a unitary structure.

7. A hollow molded article the sections of which are united by integral offsets.

This specification signed this 16th day of February, 1925.

ALEXANDER REIN.

This specification signed this 16th day of February, 1925.

RUDOLF LIEFKE.